United States Patent [19]

Broersma et al.

[11] 4,179,411

[45] Dec. 18, 1979

[54] METHOD OF PREPARING A CONTROLLED PORE VOLUME ALUMINA WITH CITRIC ACID

[75] Inventors: Frank R. Broersma, Anaheim, Calif.; Monica E. Choca, Chicago, Ill.

[73] Assignee: Nalco Chemical Company, Oak Brook, Ill.

[21] Appl. No.: 850,123

[22] Filed: Nov. 10, 1977

Related U.S. Application Data

[63] Continuation-in-part of Ser. No. 825,995, Aug. 19, 1977, abandoned, which is a continuation-in-part of Ser. No. 630,485, Nov. 10, 1978, abandoned.

[51] Int. Cl.$^2$ .................. B01J 21/04; B01J 23/28; B01J 23/30; B01J 23/74
[52] U.S. Cl. ........................... 252/465; 252/463; 252/466 J; 208/216 PP; 208/254 R; 423/626; 423/628
[58] Field of Search ............ 252/317, 463, 465, 466 J; 208/216 R, 216 PP; 423/626, 628

[56] References Cited

U.S. PATENT DOCUMENTS

| | | | |
|---|---|---|---|
| 3,105,053 | 9/1963 | Cramer et al. | 252/317 X |
| 3,105,739 | 10/1963 | Hayes | 423/628 |
| 3,152,865 | 10/1964 | Koch | 252/463 X |
| 3,814,683 | 6/1974 | Christman et al. | 208/216 |

*Primary Examiner*—W. J. Shine
*Attorney, Agent, or Firm*—John G. Premo; Robert A. Miller

[57] ABSTRACT

A method for preparing an alumina having controlled pore volume distribution is disclosed. The method requires the presence of 0.1–15% by weight of a water soluble aliphatic polycarboxylic acid having from 2–12 carbon atoms based on the dry weight of $Al_2O_3$, during alumina precipitation. The resultant calcined alumina has a pore volume distribution such that:

A. Nitrogen desorption measurements indicate that less than 10% of the total pores as determined by said method fall between 100–1200Å in diameter;

B. Nitrogen adsorption measurements indicate that between 10–50% of the total pore volume as determined fall between 100–1200Å in diameter; and C. Mercury penetration porisimetry indicates that less than 10% of the total pores as determined by both nitrogen desorption and mercury methods fall between 100–50,000Å in diameter.

4 Claims, No Drawings

METHOD OF PREPARING A CONTROLLED PORE VOLUME ALUMINA WITH CITRIC ACID

This application is a continuation-in-part of copending application Ser. No. 825,955, filed Aug. 19, 1977, now abandoned, which in turn is a continuation-in-part of copending application Ser. No. 630,485, filed Nov. 10, 1978, now abandoned.

INTRODUCTION

This invention relates to a method for the preparation of an alumina having a controlled pore volume distribution wherein a poly-carboxylic acid is present during the alumina precipitation. The resultant alumina thus produced contains a minimal amount of pore volume in the range 100 to 50,000 Å in diameter as determined by mercury porisimetry and nitrogen desorption porisimetry. The preferred alumina contains less than 5% of the total pore volume in this region as determined by mercury porisimetry and nitrogen desorption techniques. The nitrogen adsorption porisimetry, for the same samples, indicates a significant number of pores in the region above 100 Å in diameter. The preferred catalyst contains from 5% to 30% pore volume above 100 Å as determined by nitrogen adsorption porisimetry.

The controlled pore volume alumina as disclosed here is suitable for use as catalyst supports for such processes as hydrodesulfurization and denitrogenation. Hydrodesulfurization processes requiring a catalyst with these characteristics are described in U.S. Pat. No. 3,814,683.

The alumina having a controlled pore size as prepared by our invention is useful in that a large portion of the pores are distributed in a very narrow pore diameter range. Such distribution allows for maximum utilization of pore volume without sacrificing such physical properties as crush and attrition. The alumina described herein is particularly interesting where a molecular sieve function is desired.

OBJECTS

It is therefore an object of the present invention to provide to the art a method for the preparation of an alumina having a controlled pore size.

It is a further object of this invention to provide to the art a method for the control of pore sizes in alumina supports by the addition of poly-carboxylic acids to the alumina during precipitation.

It is a still further object of this invention to provide to the art a method for preparing controlled pore size alumina supports by the addition of a water soluble aliphatic poly-carboxylic acid containing from 2-12 carbon atoms during the precipitation of the alumina to form superior catalysts used for hydrodesulfurization and hydrodenitration.

Other objects will appear hereinafter.

BACKGROUND OF THE INVENTION

The method of pore volume determination is essential to the characterization of our invention. Nitrogen desorption and mercury penetration techniques indicate virtually no pores above 100 Å in diameter. However, nitrogen absorption techniques indicate that up to 30% of the total pore volume exists in this region. This disagreement is a well-known phenomena and thought to occur as a result of the pore configuration. Pores which are cylindrical in shape will give similar nitrogen absorption and nitrogen desorption isotherms. Irregularly shaped pores or "ink bottle" shaped pores will have significantly different pore volume distributions depending on the method of determination. For "ink bottle" shaped pores or pores having narrow entrances, the nitrogen desorption and mercury intrusion pore volume distributions are thought to be representative of the size of the pore opening or pore orifice. However, nitrogen adsorption is not influenced by the pore opening but rather reflects the average diameter profile of the entire pore. This difference is important in characterizing catalysts since the size of the pore opening or orifice will act as a screen to the size of molecule which can diffuse into the catalyst. The alumina made by the use of our invention gives pore volume distributions which are typical of those thought to be caused by restricted or narrow necked openings to pores.

Thus, the novel alumina described in this invention provided an improvement in the art in that it allows molecules of a selective size to pass through an orifice into an enlarged pore cavitiy where maximum surface area is available for reaction.

THE INVENTION

The general method used in this invention for preparing an alumina useful as a catalyst support having a controlled pore volume distribution comprises the steps of:
A. Preparing an aluminum hydroxide gel from an aqueous solution of soluble aluminum salts, said aqueous solution containing a water soluble aliphatic polycarboxylic acid containing 2-12 carbon atoms, said polycarboxylic acid being present at a level of from 0.1-15% by weight based on the dry weight of the alumina;
B. Purifying said aluminum hydroxide gel;
C. Forming said aluminum hydroxide gel;
D. Drying said aluminum hydroxide gel;
E. Calcining said aluminum hydroxide gel; and then,
F. Recovering an alumina useful as a catalyst support having a controlled pore volume distribution.

The controlled pore volume distribution obtained in this invention is characterized in that:
A. Nitrogen desorption measurements indicate that less than 10% of the total pores as determined by said method fall between 100-1200 Å in diameter;
B. Nitrogen adsorption measurements indicate that between 10-50% of the total pore volume as determined fall between 100-1200 Å in diameter; and,
C. Mercury penetration porisimetry indicates that less than 10% of the total pores as determined by both nitrogen desorption and mercury methods fall between 100-50,000 Å in diameter;

In addition to preparing catalyst supports, this invention also has applicability to the preparation of hydrotreating catalysts either using the catalyst support previously described or using the water soluble aliphatic polycarboxylic acid containing 2-12 carbon atoms in the form of a salt of a catalytically active metal from the group consisting of cobalt and/or nickel to directly prepare a hydrotreating catalyst.

We have discovered that aluminas precipitated in the presence of a water soluble aliphatic polycarboxylic acid will cause pore distribution such that nitrogen desorption measurements indicate that less than 10% and preferably less than 8% of the total pores as determined by this method fall between 100-1200 Å in diameter. Characteristics of the alumina precipitated in the presence of the polycarboxylic acids in accord with our invention also indicate that by nitrogen adsorption measurements between 10 and 50% and preferably 10 and 30% of the total pore volume as determined by this method will fall between 100–1200 Å in diameter, and that by mercury penetration porisimetry less than 10% and preferably less than 8% of the total pores as determined by both nitrogen desorption and mercury porisimetry methods will fall between 100–50,000 Å in diameter.

Mono-carboxylic acids and aldonic acids have been known in the art for their influence on alumina pore volumes (see U.S. Pat. No. 2,996,460). Our invention shows that polycarboxylic acids eliminate most pores over 100 Å diameter (as determined by nitrogen desorption porisimetry and mercury porisimetry) when present during precipitation of alumina. Alumina prepared by the use of polycarboxylic acids during precipitation shows significant pores in this region as determined by nitrogen adsorption. It is thought that the polycarboxylic acid may be promoting formation of an alumina with essentially bottle-shaped pores having openings of 100 Å diameter or less.

The polycarboxylic acids useful in our invention are aliphatic, water soluble, and generally contain from 2–12 carbon atoms. Examples useful in our invention but which are non-limiting include the above and water soluble aliphatic di-, tri-, and higher carboxylic acids, such as isosuccinic acid, succinic acid, oxalic acid, citric acid, malonic acid, adipic acid, tartaric acid, sebacylic acid and all other carboxylic acids falling within the terms of our invention providing that they are water soluble, aliphatic, and contain no more than 12 carbon atoms. Preferred polycarboxylic acids include citric acid and oxalic acids.

The pore volume distributions of our samples were determined using Micromeritics commercial Mercury Penetration porisimeter (model 900/910 Series) and a Digisorb 2500 for nitrogen porisimetry.

The Mercury Penetration porisimeter determines the amount of mercury forced into a calcined, evacuated sample at a given pressure. An inverse relationship exists between this given pressure and the pore diameter penetrated. This relationship is defined in the well known Washburn equation $$P = \frac{-2v\cos\theta}{r}$$

where $\theta$ is the contract angle of the mercury with the sample. P is the pressure. r is the radius of the pore penetrated. $\gamma$ is the mercury surface tension. Using this relationship, the pore diameter, pore-size distribution, and pore volume from 40 Å through 140,000 Å (diameter) can be calculated. The nitrogen porisimeter determines the nitrogen adsorption or desorption isotherm of a sample at liquid nitrogen temperature. The isotherm is a measure of the volume of nitrogen adsorbed or desorbed, for a given weight of sample, as a function of the relative pressure, P/Po. Here P is the actual vapor pressure, and Po is the vapor pressure of the bulk adsorbed nitrogen at the operating temperature. This isotherm data is translated into pore diameter, pore-size distribution and pore volume by means of a modified Kelvin equation. The corrections, for surface adsorbed nitrogen, are performed as described by B. F. Roberts, Journal of Colloid and Interface Science 23, 266–273 (1967). The modified Kelvin equation assumes capillary condensation is open ended, nonintersection, cylindrical pores. Discussions of the theory and development of the Kelvin equation can be found in Gregg and Sing, *Adsorption, Surface Area and Porosity*, 1967, Academic Press, N.Y. The pore diameter range of the nitrogen porisimeter is 20 Å through 1200 Å.

In the typical use of our invention, an amorphous or pseudo-boehmite gel of aluminum hydroxide is prepared by well-known techniques. This can be done by precipitating aluminum hydroxide from any solution of soluble aluminum salts. Methods we prefer to use in the course of our invention have been fully described in numerous U.S. Pat. Nos. including 2,943,065; 2,984,620; 2,984,630; 2,988,520 and 2,996,460 all of which are hereinafter incorporated by reference into this application. Our invention includes the use of any method of preparing an aluminum hydroxide gel which when purified, dried, and calcined will produce a porous alumina. This alumina may or may not contain catalytically active metals.

A typical method of making amorphous or pseudo-boehmite gel of alumina hydroxide for this invention generally involves precipitating the aluminum hydroxide from a solution of its soluble aluminum salts. The precipitation is achieved by titrating the soluble aluminum salt solution with an acid or basic solution to bring the resulting pH into the range from 5–9 where a white aluminum hydroxide precipitate appears. The polycarboxylic acid is dissolved into one of the starting solutions. A typical method of this invention involves the preparation of a solution of sodium aluminate containing the desired amount of polycarboxylic acid. The pH of this solution is greater than 10. A second solution containint aluminum sulfate is prepared. The pH of this solution is less than 4. The aluminum sulfate solution is then titrated into the sodium aluminate solution. The aluminum hydroxide precipitate begins to appear at about pH 9.6, and the titration is typically continued to an end point of about pH 8.8. This general preparation can also be made using aluminum chloride or aluminum nitrate as starting solutions, instead of the aluminum sulfate. The pH titration may also be done with sulfuric acid or ammonia instead of the aluminum salts.

In the practice of our invention from 0.1 to 15% and preferably from 2 to 10% by weight of the water soluble aliphatic polycarboxylic acid is present during alumina precipitation based on the dry weight of $Al_2O_3$. The polycarboxylic acid employed within our invention may also be added in the form of a water-soluble salt of at least one catalytically active metal such as cobalt or nickel citrate so as to produce an aluminum gel which contains admixed a catalytically active metal or metals so as to form a catalyst at this point.

When the polycarboxylic acid is utilized in the form of a salt of at least one water soluble catalytically active metal salt such as cobalt or nickel citrate as described above, a hydro-treating catalyst having good activity is formed. Those familiar with the art will readily realize the useful metal components for catalysts of this type and additional other materials which may also be added at this point in the form of their water-soluble salts. Examples of a metal which while not forming soluble salts with the polycarboxylic acids but which may be added at this step nevertheless are molybdenum and tungsten generally in the form of their ammonium-ATE salts.

In order to further illustrate our invention the following examples are presented.

EXAMPLE 1

This example shows the formation of an alumina using gluconic acid, a mono-carboxylic acid, as an additive and serves as a comparison for example 2 which contains citric acid, a polycarboxylic acid. 20.25 gallons of water were heated to 125° C. 130 grams of NaOH and 2250 grams of sodium aluminate having a 1.14 molar ratio of $Na_2O/Al_2O_3$ and containing 46% $Al_2O_3$ were added with good mixing to a container. 235 ml of a 50% gluconic acid solution and 75 ml of a 50% $Na_2SiO_3$ solution were added to the mixture with continued mixing. In a separate container, a solution of aluminum sulfate was prepared by mixing 9 gallons of water, 165 ml. concentrated $H_2SO_4$ and 34.75 lbs. of $Al_2(SO_4)_3$ $18H_2O$. This solution was titrated into the reaction vessel at a rate of about 500 ml. per minute. The final pH of the reaction mixture which contained precipitated aluminum hydroxide was 8.8 at a temperature of 122° F. The gel was dewatered by filtering on buchner funnels.

The filter cake was reslurried in water and spray dried at 225° F. The spray dried material was then purified by slurrying with 2 gallons of water, filtering, and washing with 4 gallons of water. Again, the filter cake was reslurried with 2 gallons of water, filtered, and then washed with 4 gallons of water. This filter cake was then oven dried for 3 hours at 120° F. The dried material was then extruded, predried and calcined at 1,150° F. to give a final pill of about 1/16 inch in diameter.

EXAMPLE 2

Example 1 was repeated with the exception that an equimolar quantity, 140 grams of citric acid, was substituted for the gluconic acid.

EXAMPLE 3

This example serves as a comparison for Examples 4 through 7. 37 gallons of water were charged to a reaction vessel and heated to 122°. 114 ml. of a 50% of gluconic acid plus 151 ml. of a 50% solution silicate solution were added. The temperature was brought to 117° F. At this time, 4,806 grams of sodium aluminate having 1.14 molar ratio $Na_2O/Al_2O_3$ and containing 46% $Al_2O_3$ was added followed by 278 grams of sodium hydroxide. A solution of 700 ml. of concentrated sulfuric acid and 3.9 gallons of water was then pumped into the reaction vessel at a rate of about 685 ml. per minute. In a separate container, alum was prepared by adding 2,825 grams of $Al_2(SO_4)_3$ $18H_2O$ to 3.5 gallons of water containing 35.25 milliliters of concentrated sulfuric acid. The alum was titrated into the reaction vessel at a rate of 400 milliliter per minute to give a final pH of 9.4. This material was then dewatered on buchner funnels. The resultant filter cake was spray dried at 215° F., 8 pounds of the spray-dried material being collected. This material was washed 3 times similar to the procedure found in Example 1 and was then predried at 120° F. for 3 hours. The spray-dried material was hydrothermally impregnated with $MoO_3$ and $CoCO_3$ to give 13.5% $MoO_3$ and 3% CoO on the calcined product. The impregnated material was oven dried for 4 hours at 120° F. and extruded, predried and calcined to give a final pill of about 1/16 inch in diameter.

EXAMPLE 4

The same procedure as Example 3 was followed with the exception being that 70.5 grams of citric acid were used in place of the gluconic acid in that example. The final pH of the aluminum gel was 9.2. This gel was spray-dried at 215° F. This operation gave approximately 8 pounds of spray-dried material. The material was then slurried in water and filtered several times as in Example 1. This purified material was hydrothermally impregnated with $MoO_3$ and $CoCO_3$ as in Example 3. The mixture was then predried at 300° F. for 2 hours, and then extruded. The pills were predried and calcined.

EXAMPLE 5

The same procedure as Example 3 was followed with the exception being that in place of the gluconic acid were added 76 milliliters of a 50% solution of gluconic acid and 47 grams of citric acid.

EXAMPLE 6

The procedure of Example 3 was followed with the exception being that 94 grams of citric acid were used in place of the gluconic acid.

EXAMPLE 7

The procedure of Example 3 was followed with the exception that 42.7 grams of nitrilotriacetic acid were used in place of the gluconic acid.

EXAMPLE 8

The catalytic suitability of samples produced in Examples 4, 6 and 7 are shown for hydrodesulfurization. One hundred milliliters of catalyst were tested for desulfurization activity on heavy vacuum gas oil (gravity, API 20.0; boiling range 742°–1065° F.) containing 2.79% sulfur by weight. The test conditions were:
Temperature: 650° F.
Pressure: 450 psig
LHSV, vol. oil/hr/vol catalyst 3
$H_2$(100%): 2500 std. cu. ft/bbl oil
The desulfurization results were as follows:

|  | Average Bulk Density (g/ml) | % Sulfur |
| --- | --- | --- |
| Example 4 | .67 | 1.43 |
| Example 6 | .69 | 1.27 |
| Example 7 | .67 | 1.30 |

EXAMPLE 9

The alumina supports of Examples 1 through 7 were evaluated. Table I shows the composition and physical characteristics of the resultant supports or catalysts. Table II gives pore size distributions as percent pore volume as obtained by both nitrogen desorption and nitrogen adsorption techniques. Table III gives mercury pore volume dimensions on Examples 1 through 7 as the percent of pore volume having a pore diameter greater than the pore diameter specified. As seen, on both Tables II and III Examples 1 and 3, those samples prepared using a mono-carboxylic acid, have more large diameter pores. Especially interesting is Example 2 in which mercury pore volume data, Table III, shows that only 3.8% of the pores are 100 Å or larger as compared to 75% for its control, Example 1. Similar reductions are seen for the other examples (5, 6 and 7) as compared to their control, Example 3.

TABLE I:

Chemical and Physical Properties of Alumina Supports or Catalysts

| Example No. | 1 | 2 | 3 | 4 | 5 | 6 | 7 |
|---|---|---|---|---|---|---|---|
| Pill diameter (in) | | | | .063 | .057 | .063 | .063 |
| Crush (lbs) | | | | 17.4 | 18.7 | 26.7 | 23.0 |
| ABD (g/ml.) | | | | .67 | .66 | .69 | .67 |
| MoO$_3$ (wt %) | | | 13.9 | 12.5 | 9.5 | 13.0 | 13.0 |
| CoO | | | 3.16 | 3.34 | 2.54 | 3.65 | 3.52 |
| NiO | | | .02 | .03 | .02 | .02 | .03 |
| P$_2$O$_5$ | | | .01 | .03 | .05 | — | .00 |
| SiO$_2$ | | | 1.8 | 1.9 | 2.1 | 2.1 | 1.9 |
| Al$_2$O$_3$ | | | 80.0 | 78. | 83. | 79. | 77. |
| CaO | | | .73 | .42 | .48 | .47 | .37 |
| Na$_2$O | 1.7 | 2.6 | .17 | 1.6 | 1.11 | 1.03 | 1.72 |
| SO$_4$ | 18.9 | 3.4 | .44 | 1.8 | 1.35 | .99 | 2.61 |
| Vm | 57.3 | 3.71 | 1.54 | 1.5 | .69 | 1.46 | 1.72 |

TABLE II

Volume Percent Pore Volume as determined by Nitrogen Porisimetry (A = adsorption, D = desorption)

| Pore size Distribution % Pore Volume | Ex. 1 A | Ex. 1 D | Ex. 2 A | Ex. 2 D | Ex. 3 A | Ex. 3 D | Ex. 4 A | Ex. 4 D | Ex. 5 A | Ex. 5 D | Ex. 6 A | Ex. 6 D | Ex. 7 A | Ex. 7 D |
|---|---|---|---|---|---|---|---|---|---|---|---|---|---|---|
| 600–250Å dia. | 23.4 | 11.9 | 3.0 | .3 | 3.2 | | 3.4 | 0.0 | | | 1.8 | .1 | 2.6 | |
| 250–150 | 16.2 | 22.1 | 2.0 | .5 | 1.5 | | 2.6 | 0.0 | | | 2.1 | .2 | 1.9 | |
| 150–95 | 11.9 | 14.7 | 3.2 | .5 | 1.5 | | 4.4 | 1.5 | | | 4.1 | .3 | 3.5 | |
| 95–90 | 1.4 | 1.8 | .4 | 0 | .2 | | .8 | .2 | | | .8 | 0 | .7 | |
| 90–85 | 1.5 | 2.1 | .6 | 0 | .2 | | .9 | .2 | | | .9 | 0 | .8 | |
| 85–80 | 1.7 | 2.1 | .6 | 0 | .2 | | 1.0 | .2 | | | 1.0 | .2 | 1.0 | |
| 80–75 | 2.0 | 1.5 | .7 | 0 | .2 | | 1.3 | .4 | | | 1.3 | 0 | 1.2 | |
| 75–70 | 2.1 | 1.7 | .8 | .2 | .4 | | 1.7 | .4 | | | 1.5 | .1 | 1.5 | |
| 70–65 | 2.2 | 2.1 | 1.0 | .2 | .4 | | 2.0 | .6 | | | 1.9 | 0 | 1.9 | |
| 65–60 | 2.3 | 2.5 | 1.2 | .2 | .4 | | 2.3 | .9 | | | 2.3 | .3 | 2.4 | |
| 60–55 | 2.5 | 2.9 | 1.7 | .2 | .8 | | 2.9 | 1.1 | | | 2.8 | 0 | 3.1 | |
| 55–50 | 2.9 | 3.5 | 2.1 | .2 | .9 | | 3.6 | 1.7 | | | 3.5 | .3 | 4.1 | |
| 50–45 | 3.2 | 3.8 | 3.2 | .4 | 1.5 | | 4.7 | 3.5 | | | 4.5 | .6 | 6.1 | |
| 45–40 | 3.4 | 4.4 | 4.5 | .4 | 2.6 | | 6.2 | 7.8 | | | 6.1 | 1.6 | 8.1 | |
| 40–35 | 3.7 | 4.2 | 7.3 | 1.0 | 4.3 | | 9.1 | 13.6 | | | 8.2 | 12.5 | 10.2 | |
| 35–30 | 4.1 | 4.4 | 11.0 | 6.9 | 7.4 | | 12.4 | 17.4 | | | 11.3 | 20.7 | 12.9 | |
| 30–25 | 4.2 | 4.8 | 15.5 | 32.5 | 12.9 | | 15.5 | 24.6 | | | 14.3 | 22.1 | 13.5 | |
| 25–20 | 4.4 | 5.7 | 18.5 | 43.1 | 18.5 | | 13.9 | 25.4 | | | 15.1 | 30.4 | 13.4 | |
| 20–15 | 4.7 | 3.6 | 17.5 | 13.2 | 24.0 | | 10.7 | .1 | | | 13.7 | 10.6 | 10.9 | |
| 15–10 | 2.0 | 0 | 4.1 | 0 | 28.6 | | 0 | 0 | | | 2.8 | 0 | .1 | |
| 10–5 | 0 | 0 | 0 | 0 | 0 | | 0 | 0 | | | 0 | 0 | 0 | |
| Total PV to 1200Å | .72 | .76 | .49 | .49 | .399 | | .55 | .559 | .56 | | .55 | .55 | .54 | |
| 1200–200 | .360 | .357 | .04 | .006 | .024 | | .056 | .010 | .045 | | .04 | .003 | .041 | |
| 1200–100 | .503 | .522 | .09 | .012 | .0396 | | .15 | .043 | .127 | | .133 | .008 | .136 | |
| % PV above 100 Å | 70 | 67 | 18 | 2.4 | 10 | | 27 | 7.7 | 23 | | 24 | 1.4 | 25 | |

TABLE III

Pore Volume Distribution as Determined by Mercury Porisimetry (ml/g)

| Pore diameter range (Å) | Ex. 1 | 2 | 3 | 4 | 5 | 6 | 7 |
|---|---|---|---|---|---|---|---|
| 100–50,000 | .544 | .019 | .167 | .018 | .028 | .013 | .036 |
| 100–200 | .162 | .010 | .006 | .008 | .010 | .006 | .021 |
| 200–400 | .229 | .004 | .008 | .003 | .006 | .003 | .006 |
| 400–600 | .052 | .001 | .009 | .002 | .003 | .001 | .004 |
| 600–1200 | .095 | .002 | .025 | .002 | .005 | .001 | .004 |
| 1200–50,000 | .016 | .002 | .118 | .004 | .005 | .002 | .002 |
| 200–1200 | .376 | .007 | .043 | .007 | .014 | .006 | .014 |
| 100–1200 | .539 | .017 | .049 | .014 | .023 | .011 | .034 |
| % pores above 100 Å* | 75% | 3.8% | 32% | 3.2% | 4.9% | 2.3% | 6.6% |

*Where the total pore volume is determined by mercury and nitrogen desorption.

We claim:

1. A method for preparing an alumina useful as a catalyst support having a controlled pore volume distribution, said method consisting essentially of:
   A. Preparing an aqueous solution of a soluble aluminum salt containing a quantity to be defined in step B of a water-soluble polycarboxylic acid containing 2–12 carbon atoms;
   B. Precipitating an aluminum/hydroxide gel from the solution of the soluble aluminum salt, the quantity of polycarboxylic acid present in step A being from 0.1–15% by weight of the total dry weight of alumina present in said aluminum hydroxide gel;
   C. Purifying said aluminum hydroxide gel;
   D. Forming said aluminum hydroxide gel;
   E. Drying said aluminum hydroxide gel;
   F. Calcining said aluminum hydroxide gel; and then,
   G. Recovering an alumina useful as a catalyst support having a controlled pore volume distribution;
   said pore volume distribution being characterized in that:
   A. Nitrogen desorption measurements indicate that less than 10% of the total pores as determined by said method fall between 100–1200 Å in diameter;
   B. Nitrogen adsorption measurements indicate that between 10–50% of the total pore volume as determined fall between 100–1200 Å in diameter; and,
   C. Mercury penetration porisimetry indicates that less than 10% of the total pores as determined by both nitrogen desorption and mercury methods fall between 100–50,000 Å in diameter.

2. The method of claim 1 where the nitrogen desorption measurements indicate that less than 8% of the total pores as determined by said method fall between 100–1200 Å diameter; that nitrogen adsorption measurements indicate between 10–30% of the total pore volume as determined by said method fall between 100–1200 Å diameter; and that mercury penetration porisimetry indicates that less than 8% of the total pores as determined by both nitrogen desorption and mercury methods fall between 100–50,000 Å diameter.

3. The method of claim 1 wherein the water-soluble aliphatic carboxylic acid is citric acid.

4. A method for the preparation of a hydrotreating catalyst which contains at least one metal from the group consisting of molybdenum, tungsten, cobalt and nickel on an alumina support, said support being characterized as having a controlled pore volume distribution, said method comprising:

A. Preparing an alumina hydroxide gel from an aqueous solution of soluble aluminum salts, said aqueous solution containing a water-soluble catalytically active metal salt of an aliphatic water-soluble tri and higher carboxylic acid, the catalytically active metal being selected from the group consisting of cobalt and/or nickel, said carboxylic acid being present at a level of from 0.1–15% of the alumina;

B. Purifying said aluminum hydroxide gel;
C. Forming said aluminum hydroxide gel;
D. Drying said aluminum hydroxide gel;
E. Calcining said aluminum hydroxide gel; and then,
F. Recovering a hydrotreating catalyst having a controlled pore volume distribution, said pore volume distribution being characterized in that:

A. Nitrogen desorption measurements indicate that less than 10% of the total pores as determined by said method fall between 100–1200 Å in diameter;
B. Nitrogen adsorption measurements indicate that between 10–50% of the total pore volume as determined fall between 100–1200 Å in diameter; and,
C. Mercury penetration porisimetry indicates that less than 10% of the total pores as determined by both nitrogen desorption and mercury methods fall between 100–50,000 Å in diameter.

* * * * *